US009117317B2

(12) United States Patent
Heiden et al.

(10) Patent No.: US 9,117,317 B2
(45) Date of Patent: Aug. 25, 2015

(54) INTELLIGENT PHYSICAL MAIL METHOD AND SYSTEM

(75) Inventors: Richard W. Heiden, Shelton, CT (US);
Arthur J. Parkos, Southbury, CT (US);
John F. Braun, Fairfield, CT (US);
Jean-Hiram Coffy, Norwalk, CT (US);
Bertrand Haas, New Haven, CT (US);
Bradley R. Hammell, Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 2444 days.

(21) Appl. No.: 11/588,058

(22) Filed: Oct. 26, 2006

(65) Prior Publication Data

US 2008/0103791 A1  May 1, 2008

(51) Int. Cl.
*G07B 17/00* (2006.01)
*G06Q 10/10* (2012.01)

(52) U.S. Cl.
CPC .......... *G07B 17/00435* (2013.01); *G06Q 10/10* (2013.01); *G07B 2017/0004* (2013.01); *G07B 2017/00443* (2013.01)

(58) Field of Classification Search
CPC ............. G06Q 10/10; G07B 17/00435; G07B 2017/0004; G07B 2017/00443
See application file for complete search history.

(56) References Cited

U.S. PATENT DOCUMENTS

| | | | |
|---|---|---|---|
| 5,354,097 A * | 10/1994 | Tel | 283/72 |
| 5,778,066 A * | 7/1998 | Shah et al. | 705/62 |
| 6,311,214 B1 | 10/2001 | Rhoads | 709/217 |
| 6,542,927 B2 | 4/2003 | Rhoads | 709/217 |
| 2002/0042815 A1* | 4/2002 | Salzfass et al. | 709/206 |
| 2003/0130954 A1* | 7/2003 | Carr et al. | 705/60 |
| 2004/0178128 A1 | 9/2004 | O'Connell et al. | |
| 2004/0202386 A1* | 10/2004 | Quine | 382/305 |
| 2005/0171919 A1* | 8/2005 | Baker et al. | 705/404 |
| 2006/0215877 A1 | 9/2006 | Biasi et al. | |
| 2008/0040242 A1* | 2/2008 | Chang et al. | 705/28 |

* cited by examiner

*Primary Examiner* — Kevin Flynn
(74) *Attorney, Agent, or Firm* — Brian A. Lemm; Charles R. Malandra, Jr.; Steven J. Shapiro

(57) ABSTRACT

A method for creating an intelligent physical mailpiece includes looking up a mailpiece preference of an addressee concerning mail received by the addressee. A physical mailpiece to the addressee is prepared and includes on the mailpiece the addressee preference. The mailpiece is scanned to determine the addressee preference. The mailpiece may also be processed to link the owner of a meter employed to imprint an indicia on the mailpiece to the mailpiece.
The intelligent physical mailpiece system may include a database of recipient preferences. A sender mail creation means is coupled to the recipient preference database. A processor is coupled to a scanner. A communications means is coupled between the processor and the sender mail creation means for communicating recipient preferences to the sender mail creation means for storage in the database of recipient preferences.

6 Claims, 5 Drawing Sheets

INTELLIGENT PHYSICAL MAIL METHOD AND SYSTEM

FIELD OF THE INVENTION

The invention disclosed herein relates generally to physical mail and, more particularly, to an intelligent physical mail method and system that employs physical mail and electronic information concerning the physical mailpiece to enhance the flow of communications between a sender and a recipient.

BACKGROUND OF THE INVENTION

Systems have been developed where the contents of received physical mail are scanned and the scanned version of the contents sent electronically to the recipient. When scanning physical mailpieces in order to send a digitized version of the envelope and its contents to the recipient as an alternative to receiving paper, it is necessary to open the envelope and prepare the contents for scanning. This step is either manual or automated. However it is done, it adds time and money to the operation. The results sent to the recipient may potentially impair the user experience with the mailpiece due to reduced visual quality from digitization when scanning. This can be due to degraded image quality of the original, skewing of the scanned materials, physical affordances of paper that do not readily transfer during scanning and the like.

Various systems are known where a printed object is scanned to establish an internet address corresponding to that object such as disclosed in U.S. Pat. No. 6,311,214 B1 for LINKING OF COMPUTERS BASED ON OPTICAL SENSING OF DIGITAL DATA issued Oct. 30, 2001 and in U.S. Pat. No. 6,542,927 B2 LINKING OF COMPUTERS BASED ON STENOGRAPHICALLY EMBEDDED DIGITAL DATA issued Apr. 1, 2003. These systems involve a printed object, such as an item of postal mail, a book, printed advertising, a business card, product packaging, etc., that is stenographically encoded with plural-bit data.

As disclosed in the '214 and the '927 patents, when such an object is presented to an optical sensor, the plural-bit data is decoded and used to establish a link to an internet address corresponding to that object. An object or paper product contains digital information and is scanned so that the digital information can be quickly read and acted upon by an appropriately configured device, computer or appliance. The digital information may be hidden on the objects. These objects can be marked with the digital information, using any of the broad ranges of printing and processing techniques which are available on the market and which are widely described in the open literature and patent literature surrounding digital watermarking.

One application proposed in the '927 patent involves postal mail information where it is suggested that many contexts arise in which data to be presented to a consumer is valuable only if timely and that the postal service mail is ill-suited for some such information due to the latency between printing a document, and its ultimate delivery to a recipient; and also that principles of the '927 patent system patent (referred to as a "Bedoop" system) allow the recipient to take a postal object that was printed well before delivery, and use it on receipt (i.e., when presented to a '927 type system) to receive up-to-the-minute information. In this and other embodiments, the '927 patent system, it is asserted that data can also uniquely identify the addressee/recipient/user, so the web site can present data customized to that user. Nevertheless, these systems are not flexible in the ability of senders and recipients to utilize electronic and physical mail

SUMMARY OF THE INVENTION

It is an object of the present invention to provide an enhanced ability to create and process physical mail so as to meet recipient preferences.

It is another object of the present invention to facilitate the communications between a sender and a recipient regarding recipient preferences as to the processing of mail received by the recipient.

It is further objective of the present invention to enhance mailpiece tracking and other information available for use by a sender, carrier and/or recipient.

A method for creating an intelligent physical mailpiece embodying the present invention includes looking up a mailpiece preference of an addressee concerning received mail received by the addressee. A physical mailpiece to the addressee is prepared and includes on the mailpiece the addressee preference. The mailpiece is scanned to determine the addressee preference.

In accordance with an aspect of the present, a method for creating an intelligent physical mailpiece having an envelope with an addressee, a sender and meter indicia containing a meter serial number, imprinted thereon, includes the steps of scanning the envelope to determine the meter serial number. A meter owner database is accessed to determine the owner of the meter having the meter serial number. The meter owner is linked to the mailpiece.

An intelligent physical mailpiece system embodying the present invention includes a database of recipient preferences. A sender mail creation means is coupled to the recipient preference database. A processor is coupled to a scanner. A communications means is coupled between the processor and the sender mail creation means for communicating recipient preferences to the sender mail creation means for storage in the database of recipient preferences.

DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention. As shown throughout the drawings, like reference numerals designate like or corresponding parts.

DETAILED DESCRIPTION OF THE PRESENT INVENTION

Figure 1:
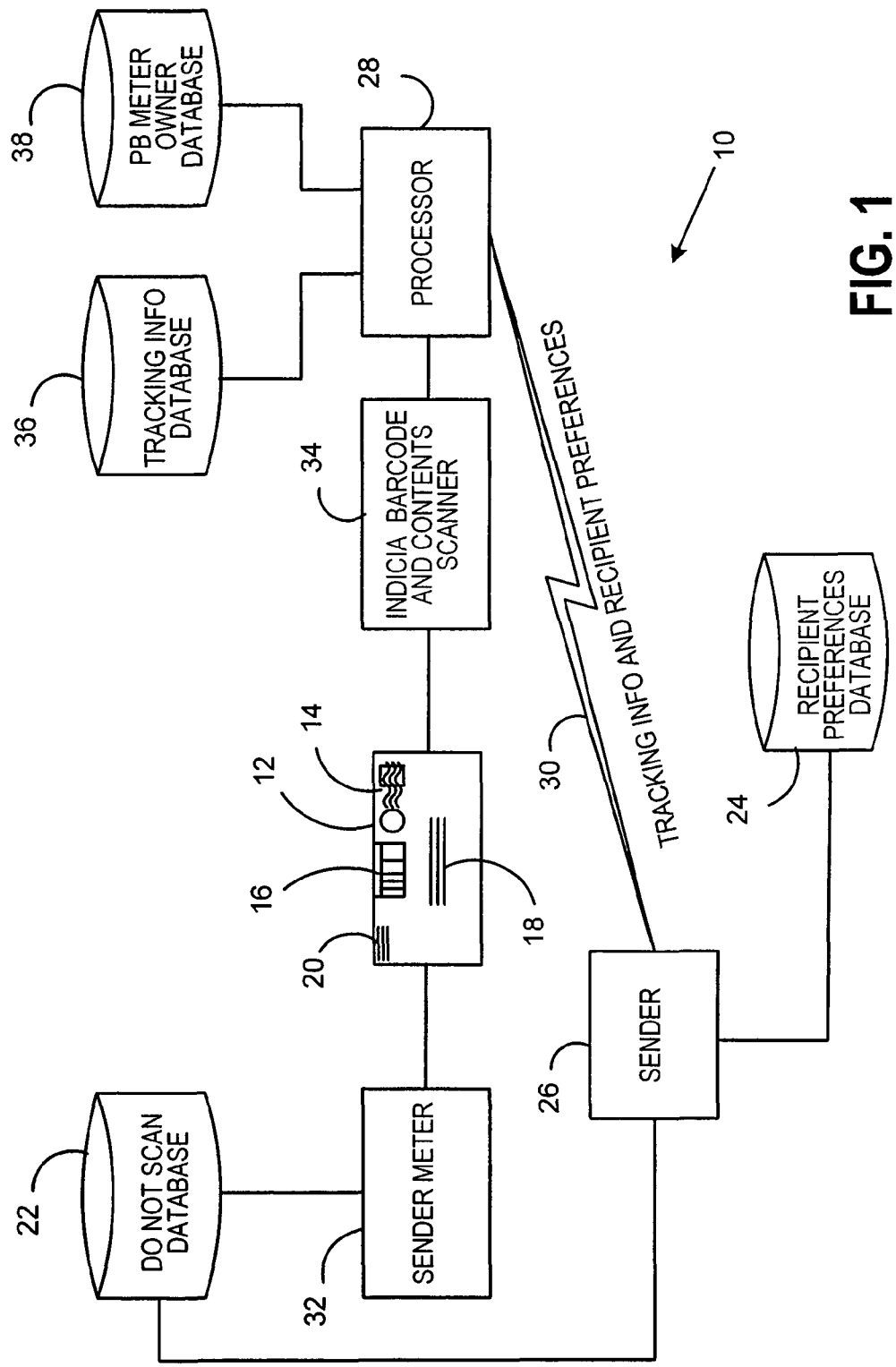
FIG. 1 is a block diagram of an intelligent physical mail system embodying the present invention.

Reference is now made to the various figures wherein like reference numerals designate like or corresponding items in the various views and, specifically, to FIG. 1. An intelligent physical mail system 10 processes mailpieces such as mailpiece 12. Information about the mailpiece 12 contents is included in the postal indicium 14 or in a separate 2D barcode (or other type barcode) 16. The mailpiece also includes recipient/addressee information 18 and sender information 20.

Mailpiece 12 is prepared based on information contained in a do not scan database 22 and a Recipient Preferences Database 24. The do not scan database 22 is a database of recipient preferences as to scanning of received mailpieces. The sender 26 may have bi-directional communications with the recipient processor and/or a recipient site processor 28. This is denoted by the electronic communications connection 30. This communications connection 30 may be employed to transmit mailpiece tracking information, recipient preference information, electronic copies of the mailpiece envelope and/or mailpiece contents and other information to facilitate the type of communications desired by the parties.

The sender may be an automated mail creation system or other system for the preparation of mailpieces, including the mailpiece contents. The term sender is intended to include the various means for the creation of mailpieces. The sender 26, based on data in the recipient preference database 24 and the do not scan database 22, causes the sender meter 32 to print the desired indicium 14 on the mailpiece. Other printing and barcodes on the mailpiece 12 envelope and contents may be implemented in the standard manner employed in creating various types of mail.

At the receiving location or site, processor 28 is connected to an indicia, barcode and content scanner 34 and also to tracking information database 36 and a meter owner database, such as PB Meter Owner Database 38. The recipient or addressee may be located at the receiving site or the receiving site may be a mail processing facility. In such case, the recipient or addressee may be physically located elsewhere.

When the system scans the outside of the mailpiece it recognizes a 2D barcode and decodes the information inside of the barcode. The decoded information tells the system about the contents, such as where and how an electronic version of the contents can be retrieved, scan or do not scan information and enables meter owner information to be obtained. The processor 28 also can update the tracking information database 36 with enhanced tracking information such as when a mailpiece, such as mailpiece 12, is scanned for digitization and when the recipient opens the electronic copy (such as an email receipt or other similar arrangements), as well as other tracking and related mailpiece information. The tracking information can be sent to the carrier for which a tracking barcode was detected or consolidated in a server or other system for later retrieval by the sender or the carrier.

The sender 26 of the mailpiece 12 can be informed via communications connection 30 of the recipient's preferences. Preferences may, for example, in the future send electronic versions rather than physical mailpieces of specific types of mail. Also, for example, a preference may be that the contents of a mailpiece be scanned and coupled with the availability and location of an electronic copy of the contents, and the electronic copy generated from scanning the mailpiece can also be compared to the electronic version identified by the sender 26 to insure the scanned version is accurate or any differences are noted for reconciliation. Any differences noted can be communicated to the recipient and/or via the communications connection 30 to the sender 26.

The intelligent physical mail system 10 can reduce the operating time involved in scanning mailpieces and mailpiece contents since needless scanning is avoided based on recipient preferences. It can also speed the immediate delivery of an available sender identified electronic version to the recipient. Providing the electronic version and comparing it with a scanned version of the mailpiece, either before or after delivery of the mailpiece to the recipient, may provide the recipient an improved image quality over merely scanned copies. It will also provide an enhanced assurance of accuracy of information content. Moreover, the electronic version identified by the sender can provide a further enhanced recipient experience by adding web sites links, user interaction, video, audio, etc.

Figure 2:
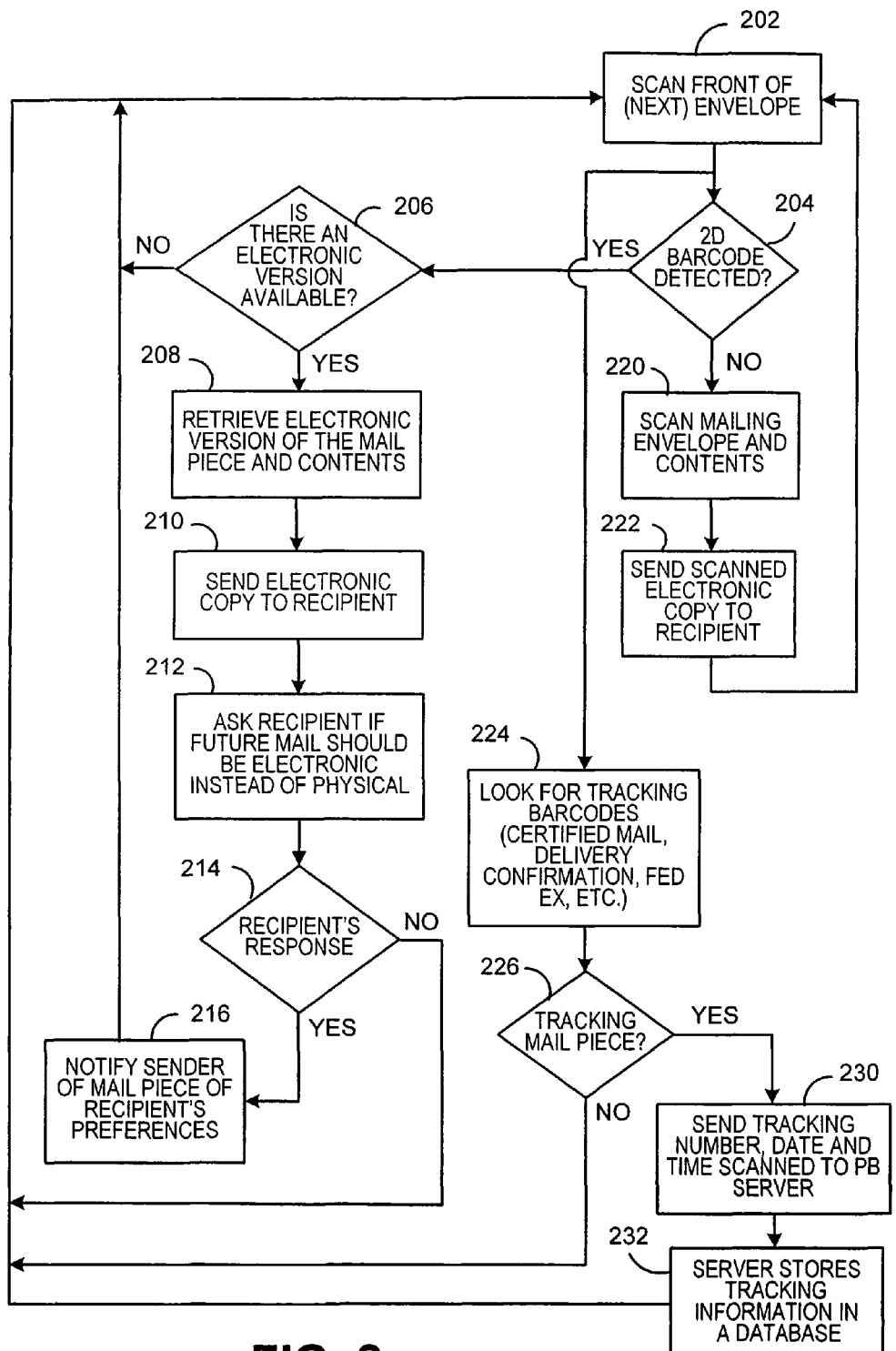
FIG. 2 is a flowchart of the system shown in FIG. 1 at the receiving site where the received physical mailpiece is scanned.

Reference is now made to FIG. 2. The front of the envelope is scanned at 202. A decision is then made at decision block 204 whether the scanner has detected a barcode. If a barcode is detected, a determination is made at decision block 206 if an electronic copy of the version of the material within the envelope is available. If no electronic version is available, the system loops back to 202 and the front of the next envelope is scanned.

Where there is an electronic version available, the system retrieves the electronic version of the mailpiece and its contents at 208 and sends an electronic copy of the electronic version to the recipient at 210. At 212, the recipient is asked if future mail should be sent to the recipient in electronic form. At 212, the requested preference of the recipient can be, for example, whether the recipient desires that all future mail or mail from particular senders should be sent in electronic form. The preference, as another example, can additionally include a time frame during which the recipient desires or does not desire to receive mail in electronic form.

At decision block 214, if the recipient determines that future mail should be in electronic form or other specific preference, the system notifies the sender of the preference at 216 and then loops back to scan the next envelope at 202. If, however, at decision block 214 the recipient does not want future mail in electronic form, the process loops back to 202 for the scanning of the next mailpiece.

Where at decision block 204, a barcode is not detected on a scanned envelope the mailpiece and its contents are scanned at 220. The scanned electronic copy is sent to the recipient at 222 and the system loops back to scan the front of the next envelope at 202.

After the scanning of the front of the next envelope at 202, at 224 the scanned results are analyzed for the presence of tracking barcodes. The tracking barcodes (or other indication of tracking information) can relate to United States Postal Service (USPS) Certified Mail, USPS Delivery Confirmation, Federal Express Tracking, etc. At decision block 226, if tracking barcodes are not present, the process loops back to 202 to scan the front of the next envelope.

At decision block 226, if tracking barcodes are present, at 230 the tracking number, date, and time scanned, or whatever information is available from the scanning process, is sent to a server, such as a Pitney Bowes Inc. server. The tracking information is stored in the server database at 232.

Figure 3:
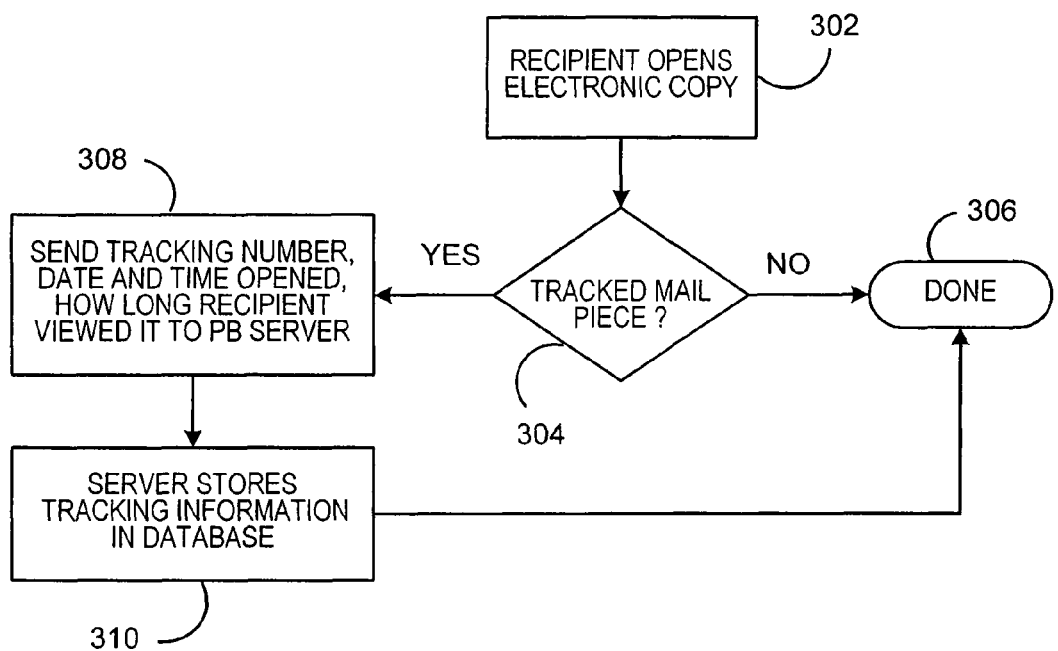
FIG. 3 is a flow chart of the operation of the system shown in FIG. 1 where the recipient opens an electronic copy of the physical mailpiece or portion thereof, such as the mailpiece contents.

Reference is now made to FIG. 3. The recipient opens the electronic copy of the communication in the letter at 302. A determination is made at decision block 304 if the mailpiece is a tracked mailpiece. Where the mailpiece is not a tracked mailpiece, the process is completed and done at 306. However, where the mailpiece is a tracked mailpiece, the tracking number, date and time opened, are sent to the server at 308. The tracking information is stored in the tracking database at 310, such as a Pitney Bowes Inc. server.

Figure 4:
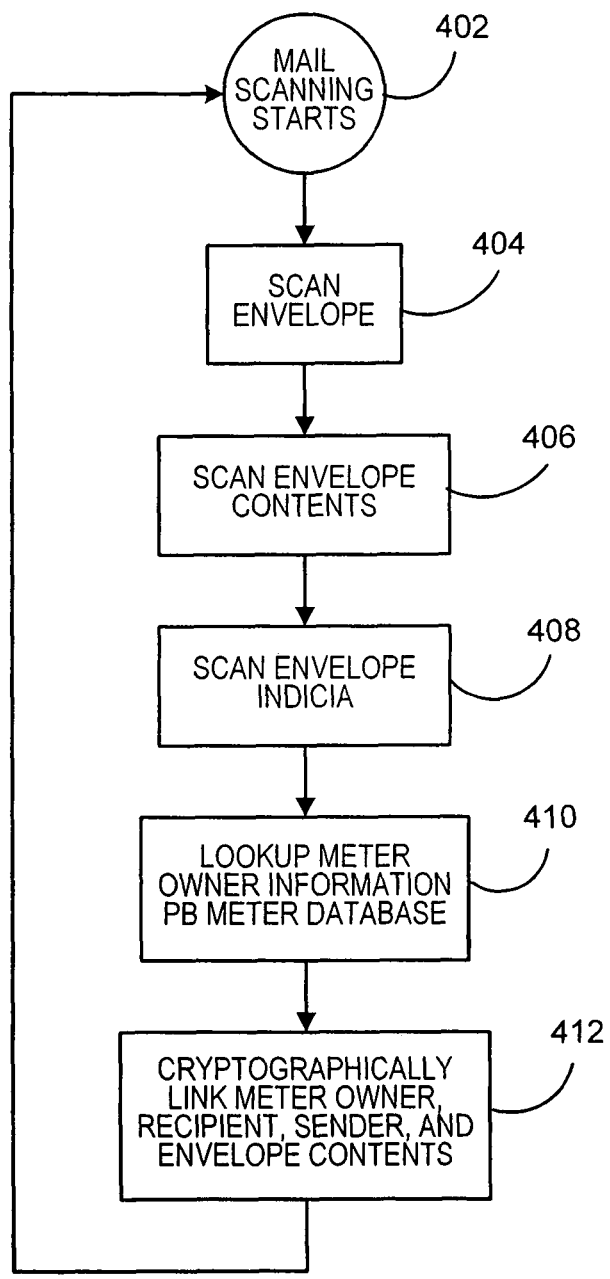
FIG. 4 is a flowchart of the authentication of the received mail by linking the scanned contents to the owner of the meter which printed the indicia on the mailpiece.

Reference is now made to FIG. 4. The mailpiece scanning commences and starts at 402. The envelope is scanned at 404 and the envelope contents are scanned at 406. An indicia on the envelope is scanned at 408. The meter owner information is looked up at 410 by retrieving the information from a meter owner database, which is part of the system. This may be done based on, for example, a meter serial number which is part of the scanned indicia and which may be linked to meter owner information. The retrieved information provides the information to enable the scanned information from the mailpiece along with the retrieved information at 412 to be cryptographically processed, such as by being hashed and cryptographically signed to link the meter owner, the recipient, the denoted sender on the mailpiece and the envelope contents at 412. Cryptographically processing the retrieved information at 412 by hashing the retrieved information, and thereafter cryptographically signing the hashed information, will provide integrity to the linked information. Other forms of cryptographic processing can also be implemented to provide privacy, authentication and non-repudiation. Variations can be made of precisely what information is linked. This linked information may be stored for later retrieval. The process then loops back and may be repeated for the next mailpiece.

Figure 5:
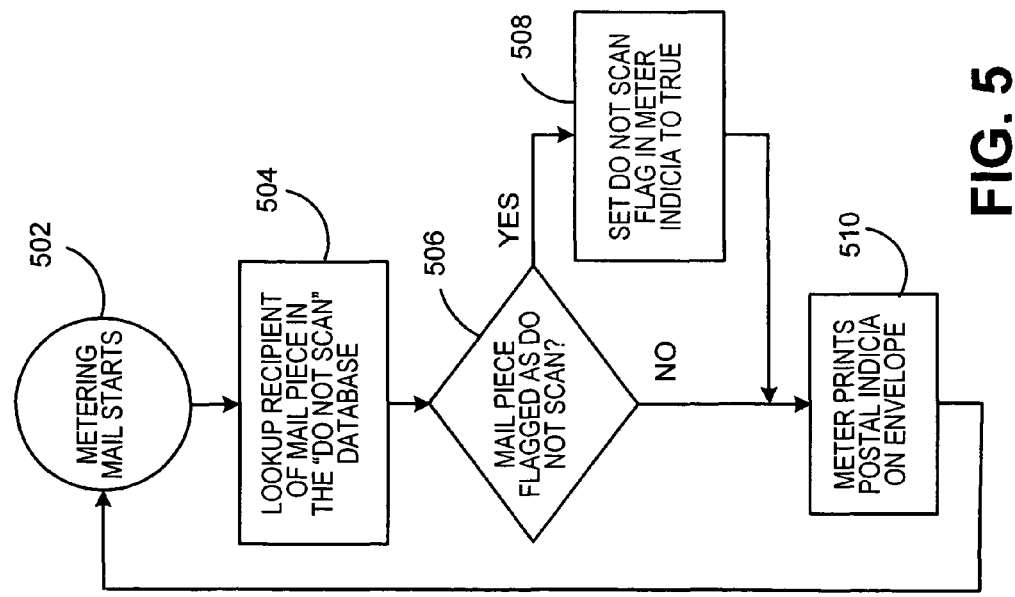
FIG. 5 is flowchart of a feature of the present invention whereby an envelope is scanned and the recipient notified of the arrival of the mailpiece but the contents are not scanned based on the preferences of the mailpiece recipient; and, FIG. 6 is a flowchart of the operation at the scanning station of a mailpiece that maybe flagged for scanning or no scanning depending on the recipient preferences.

Reference is now made to FIG. 5. The mail to be sent is metered at 502. At 504, the recipient of the mailpiece is looked up in the do not scan database. A determination is made at decision block 506 whether the mailpiece has been flagged as do not scan. If the mailpiece has been flagged as do not scan, at 508 the do not scan flag is set in the mailpiece indicia to be True, such that when the mailpiece is received, the do not scan flag will be read by the scanner. The system then continues to print the postal indicia on the envelope at 510. If, however, at decision block 506, based on the look up in the do not scan database, the mailpiece is not to contain a "do not scan" flag, the process continues at 510 and the meter prints the postal indicia but does not set the "do not scan" flag as True. The process then loops back to 502 for the metering of the next mailpiece.

Figure 6:
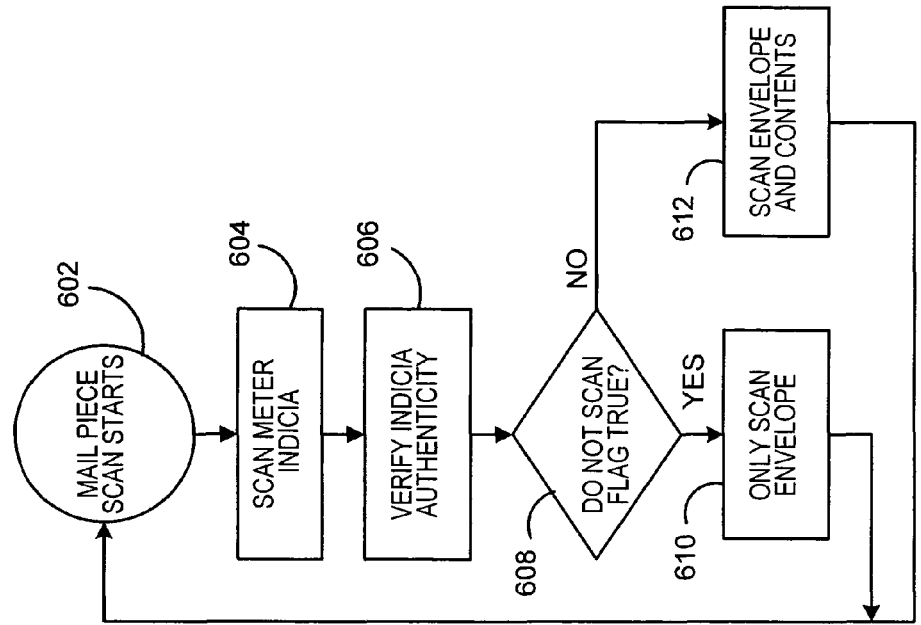

Reference is now made to FIG. 6. When the envelope has been received at the recipient's facility, the mailpiece scan starts at 602. The meter indicia is scanned at 604 and the indicium authenticity is verified at 606, should that be desired. The process continues at decision block 608, where a determination is made if the do not scan flag has been set to True. Where the do not scan flag has been set to True, only the envelope is scanned at 610. Where the do not scan flag has not been set to True, the envelope and envelope contents are scanned at 612 and the process operates as shown in FIG. 2. In either case, the process then loops back to 602 for the scanning of the next mailpiece.

Where a recipient desires a scanned version of the contents of a mailpiece such as to have a signature or other information embedded into the document itself and an electronic version is available, a comparison can be made between the electronic version and the scanned version to ensure that the scanning has been accurate. Where an inconsistency is detected between the electronic version and the scanned version, this can be noted and flagged for later resolution. This enhances the accuracy of the scanning process such that a more accurate scanned version of the document is received by the recipient. This type of functionality can also be noted in the preferences of the recipient. The availability of an electronic copy of the contents and the location to access the contents can be embedded in a barcode on the envelope or on the envelope contents and also may be encrypted, if desired, with a key available to the recipient.

The content of the mailpiece does not necessarily have to be retrievable, such as from a web page e-linked from barcodes on the mailpiece. Such an e-link may just contain some information to cause the reader to desire to retrieve the mailpiece from a mail-room. An example of this can be unique content with some graphic security. It may not be desired that such content be displayed on a screen, because of ease in printing the displayed content, and printing more than once, while the content is intended to be unique. Such content may include, for example, coupons, checks, art forms such as collector stamps, and the like. A highly simplified version of the content, such as a thumbnail, can be included in the web-page, if desired; however, just a description of the content may be sufficient. Other types of physical content that do not need to be displayed include CDs or DVDs. However, part of the visual or audio content of the CD or DVD can be made available on the web-page, but this is not the physical content of the mail-piece. One also may not want to have personal or confidential data displayed on a screen. In this case, some information about the content without the sensitive data can be displayed.

Thus, another reason why the recipient may want to know more about his/her mail before deciding whether it should be opened and scanned is that the customer may see on the web page that the mail-piece contains some personal or confidential information, whether displayed or not displayed on a screen. The recipient may decide not to have the mailpiece opened in the mail-room to protect the mailpiece content, but to have the mailpiece physically forwarded directly to such recipient or to a designee. On the other hand, the recipient may find the information, the mailpiece content, such that the mailpiece can be opened and scanned in the mail-room and forwarded to the recipient electronically. While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

What is claimed is:

1. A method for creating an electronic version of an intelligent physical mailpiece having a code imprinted thereon, comprising:

scanning, using a scanning device coupled to a processing device, the mailpiece to obtain the code;

scanning, using the scanning device, the mailpiece to obtain addressee information of a recipient;

accessing, by the processing device, a database using the scanned code to determine whether an original digitized version of the mailpiece resides on a communication network available to the recipient and to identify the electronic address of the digitized version, when available;

obtaining, by the processing device, at least a portion of the original digitized version of the mailpiece from the electronic address;

creating, by the processing device, an electronic version of the mailpiece using the digitized version; and sending, by the processing device, the electronic version of the mailpiece to the recipient using the addressee information.

2. The method of claim 1, wherein, the code is encoded in a two dimensional barcode.

3. The method of claim 1, further comprising:

scanning, using the scanning device, the mailpiece to obtain sender information including the identity of the sender;

requesting, by the processing device, an indication from the addressee regarding delivery preference of similar mail pieces from the sender;

receiving, by the processing device, the delivery preference indication from the addressee; and communicating, by the processing device, the delivery preference indication to the sender.

4. The method of claim 3, further comprising:

obtaining, by the processing device, tracking information regarding electronic receipt of the electronic version of an intelligent physical mailpiece by the addressee; and sending, by the processing device, the tracking information to the sender.

5. The method of claim 3, further comprising:

scanning and digitizing the mailpiece contents to obtain a scanned electronic version of the mailpiece; and comparing the electronic version of the mailpiece and the scanned electronic version of the mailpiece.

6. The method of claim 1, further comprising the step of:

cryptographically securing the code.

* * * * *